United States Patent [19]
Schabel

[11] Patent Number: 5,692,959
[45] Date of Patent: Dec. 2, 1997

[54] TUBE YOKE WITH DIAMOND-SHAPED RELIEF

[75] Inventor: Gregg W. Schabel, Northwood, Ohio

[73] Assignee: Dana Corporation, Toledo, Ohio

[21] Appl. No.: 660,699

[22] Filed: Jun. 3, 1996

[51] Int. Cl.⁶ .................................................. F16D 3/26
[52] U.S. Cl. ............................................ 464/134; 464/182
[58] Field of Search ........................... 464/134, 135, 464/136, 182, 162; 403/57, 74, 267, 268, 41, 383

[56] References Cited

U.S. PATENT DOCUMENTS

| | | |
|---|---|---|
| 996,156 | 6/1911 | Spicer . |
| 1,247,290 | 11/1917 | Lehman . |
| 1,247,291 | 11/1917 | Lehman . |
| 2,239,192 | 4/1941 | Cutting . |
| 2,447,881 | 8/1948 | Warner ........................ 464/135 X |
| 2,529,586 | 11/1950 | Barber ......................... 464/136 X |
| 2,559,485 | 7/1951 | Warner . |
| 3,400,558 | 9/1968 | Haines ............................ 464/162 |
| 3,867,050 | 2/1975 | Pitner .......................... 464/134 X |
| 4,020,651 | 5/1977 | Callies ......................... 464/162 X |
| 4,362,521 | 12/1982 | Puck et al. ................... 464/182 X |
| 4,541,160 | 9/1985 | Roberts ........................ 464/182 X |
| 5,342,243 | 8/1994 | Seksaria et al. .................. 464/134 |
| 5,409,332 | 4/1995 | Chabot, Jr. et al. ............. 403/57 X |
| 5,458,028 | 10/1995 | Cleveland, III .............. 464/136 X |

FOREIGN PATENT DOCUMENTS

| | | | |
|---|---|---|---|
| 1030268 | 5/1958 | Germany ........................... 464/182 |
| 346563 | 4/1931 | United Kingdom ............... 464/182 |
| 457418 | 11/1936 | United Kingdom ............... 464/135 |

*Primary Examiner*—Daniel P. Stodola
*Assistant Examiner*—William A. Rivera
*Attorney, Agent, or Firm*—MacMillan, Sobanski & Todd

[57] ABSTRACT

A driveshaft assembly includes a cylindrically shaped driveshaft tube and a tube yoke. The tube yoke is attached to the driveshaft tube and transfers torque between the driveshaft tube and a universal joint. The tube yoke has a first end having a tube seat for connecting the driveshaft tube to the tube yoke and a second end having lugs for connecting the tube yoke to the universal joint. The tube seat has an outer surface which is fixed to the driveshaft tube to prevent relative movement between the driveshaft tube and the tube yoke. A diamond-shaped relief formed in an end surface of the tube seat has two pairs of opposed points, with each point positioned 90 degrees from another point. Flats are formed between each adjacent points. The diamond-shaped relief is oriented to provide tube seat walls which are thickest at the locations which receive the greatest stress during rotation of the driveshaft assembly. Two of the points face the yoke lugs and the other two face at 90 degree angles away from the yoke lugs. The diamond-shaped relief reduces the weight of the tube yoke and prevents undesirable distortion of the tube seat which can weaken the union between the tube yoke and driveshaft tube.

19 Claims, 4 Drawing Sheets

TUBE YOKE WITH DIAMOND-SHAPED RELIEF

BACKGROUND OF THE INVENTION

This invention relates in general to driveline assemblies suitable for transferring power in a vehicle, and in particular to an improved driveshaft assembly for transferring torque between a rotating driveshaft tube and a universal joint assembly.

In many different types of vehicles, a driveline assembly is utilized to transmit rotational power from a source, such as an engine, to a driven component, such as a pair of wheels. A typical vehicular driveline assembly includes a transmission connected to the engine to provide desired gear ratios through which the engine power is delivered to the wheels. The transmission has an output shaft connected through an elongated driveshaft assembly to an input shaft of an axle assembly. Because of constraints imposed by the overall design of the vehicle, these shafts are rarely aligned such that their axes of rotation are co-axial. Therefore, universal joints are provided between the transmission output shaft and the forward end of the driveshaft assembly and between the rearward end of the driveshaft assembly and the axle assembly input shaft. The universal joints permit the axes of rotation of the adjacent shafts to be angularly disposed, while providing a rotational driving connection therebetween.

In a typical vehicular driveline assembly, a driveshaft tube is connected to a universal joint at one of its ends via a tube yoke. The tube yoke usually includes a body having a cylindrical tube seat at one end and a pair of spaced-apart arms or lugs extending from the other end. The tube yoke and driveshaft tube are typically connected By sliding the tube seat into the driveshaft tube and securing them together. The driveshaft tube and tube yoke must be secured together to form a union which can transmit the torque loads of the driveline assembly. Preferably, a weld such as a fillet weld is used to secure the tube yoke and driveshaft tube, but other forms of bonding such as adhesive may be used, especially for composite shafts. To reduce the weight of the tube yoke, the tube seat is typically hollowed out by forming a cylindrical cavity known as a relief in an end surface of the tube seat.

At the opposite end of the tube yoke, the lugs have a pair of coaxial openings extending therethrough. The universal joint includes a cross member having four outwardly extending trunnions. A bearing cup is rotatably mounted on the end of each of the trunnions. One pair of opposed bearing cups is received in the openings through the lugs of the tube yoke for connection thereto. The other pair of opposed bearing cups is connected to a yoke secured to the output shaft of the vehicle transmission or the input shaft of the axle assembly.

During operation of the vehicle, a tube yoke is subjected to heavy torque loads from rotation of the drive line assembly. These heavy loads tend to deflect the lugs of the tube yoke, thereby distorting the shape of the tube seat. When the shape of the tube seat is distorted, the union between the tube yoke and the driveshaft tube can weaken and fail. Consequently, the tube seat is constructed with sufficient strength to resist such distortion. In the past, the tube yoke has been constructed with a relatively thick tube seat wall. Unfortunately, the thick tube seat wall adds to the weight and material cost of the tube yoke. Thus, it would be desirable to provide a tube yoke that is lighter in weight, but that has sufficient strength to resist distortion of the tube seat.

SUMMARY OF THE INVENTION

This invention relates to an improved driveshaft assembly including a cylindrically shaped driveshaft tube and a tube yoke. The tube yoke is attached to the driveshaft tube and transfers torque between the driveshaft tube and a universal joint. The tube yoke has a first end having a tube seat for connecting the driveshaft tube to the tube yoke and a second end having lugs for connecting the tube yoke to the universal joint. The tube seat has an outer surface which is secured to the driveshaft tube to prevent relative movement between the driveshaft tube and the tube yoke. A diamond-shaped relief formed in the end of the tube seat has two pairs of opposed points, with each point positioned 90 degrees from another point. Flats are formed between adjacent points. The diamond-shaped relief is oriented to provide tube seat walls which are thickest at the locations on the tube seat which receive the greatest stress during rotation of the driveshaft assembly. Two of the points face the yoke lugs and the other two face at 90 degree angles away from the yoke lugs. The diamond-shaped relief reduces the weight of the tube yoke and prevents undesirable distortion of the tube seat which can weaken the union between the tube yoke and driveshaft tube.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
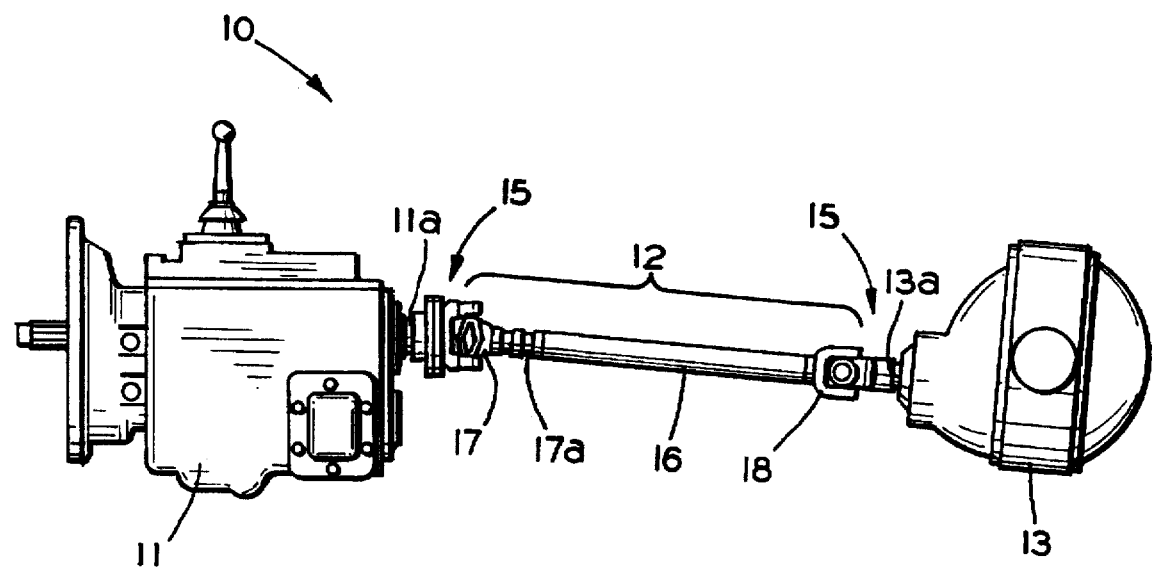
FIG. 1 is a schematic view in elevation of a driveline assembly illustrating a driveshaft assembly connected by universal joints between a transmission and an axle assembly according to the present invention.

Referring now to the drawings, there is illustrated in FIG. 1 a schematic view of a vehicular driveline assembly, indicated generally at 10. The assembly 10 includes a transmission 11 connected through a driveshaft assembly 12 to an axle assembly 13. As is typical in vehicular driveline assemblies, the output shaft 11a of the transmission 11 and the input shaft 13a of the axle assembly 13 are not co-axially aligned. Universal joints, indicated generally at 15, are provided to rotatably connect the output shaft 1 la of the transmission 11 to the forward end of the driveshaft assembly 12, and to rotatably connect the rearward end of the driveshaft assembly 12 to the forward end of the input shaft 13a of the axle assembly 13.

The driveshaft assembly 12 includes a hollow cylindrical driveshaft tube 16. The driveshaft tube 16 can be made of any suitable material, but is preferably hollow and made of metal, such as an aluminum alloy. Alternatively, the driveshaft tube 16 can be made of composite materials. As viewed in FIG. 1, a slip yoke 17 is slidably fitted over a tube shaft 17a secured to the forward end of the driveshaft tube 16. The slip yoke 17 is connected to a universal joint 15 through a suitable connection in a well known manner.

Figure 2:
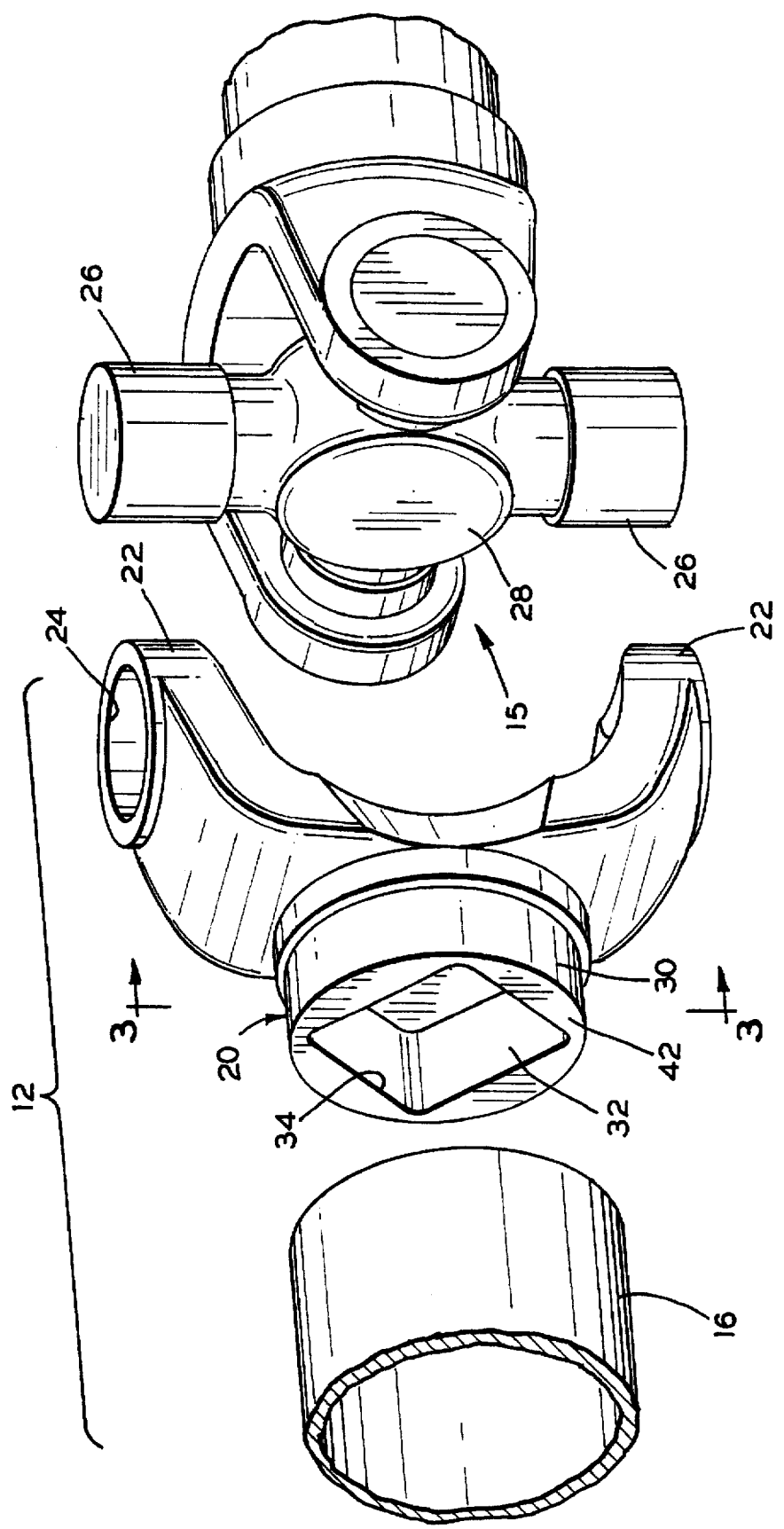
FIG. 2 is an enlarged, exploded perspective view of a driveshaft tube, a tube yoke and a universal joint of FIG. 1.

As shown more clearly in FIG. 2, a tube yoke 18 is secured to the rearward end of the driveshaft tube 16. The tube yoke 18 can be made of any suitable material, and is preferably metallic, being of an aluminum alloy. The tube yoke 18 is a generally cylindrical member having a tube seat 20 at a first end and a pair of spaced-apart, outwardly projecting lugs 22 at the opposite end. The lugs 22 are spaced approximately 180 degrees from each other and are connected to a universal joint 15. Openings 24 are aligned and formed through the lugs 22 to receive universal joint bearing assemblies 26 mounted on a universal joint cross 28. The universal joint 15 is connected to the axle assembly input shaft 13a through a suitable connection. The tube yoke 18 transmits torque from the driveshaft tube 16 to the universal joint 15.

The tube seat 20 is adapted to mate with or fit inside the hollow end of the driveshaft tube 16, thereby enabling torque to be transmitted between the driveshaft tube 16 and the tube seat 20. The tube seat 20 has a cylindrical outer surface 30 having a diameter slightly greater than the diameter of the cylindrical inner surface (not shown) of the driveshaft tube 16. The outer surface 30 of the tube seat 20 fits within the driveshaft tube 16 in a light press fit relationship. The driveshaft tube 16 and the tube yoke 18 are secured together to form a union which prevents relative movement and transmits the driveline torque loads therebetween. Preferably, a weld such as a fillet weld is used between the tube yoke 18 and the driveshaft tube 16, but other forms of bonding such as adhesive may be used, especially for composite shafts. As described above, the tube seat 20 is secured directly to the driveshaft tube 16.

Figure 3:
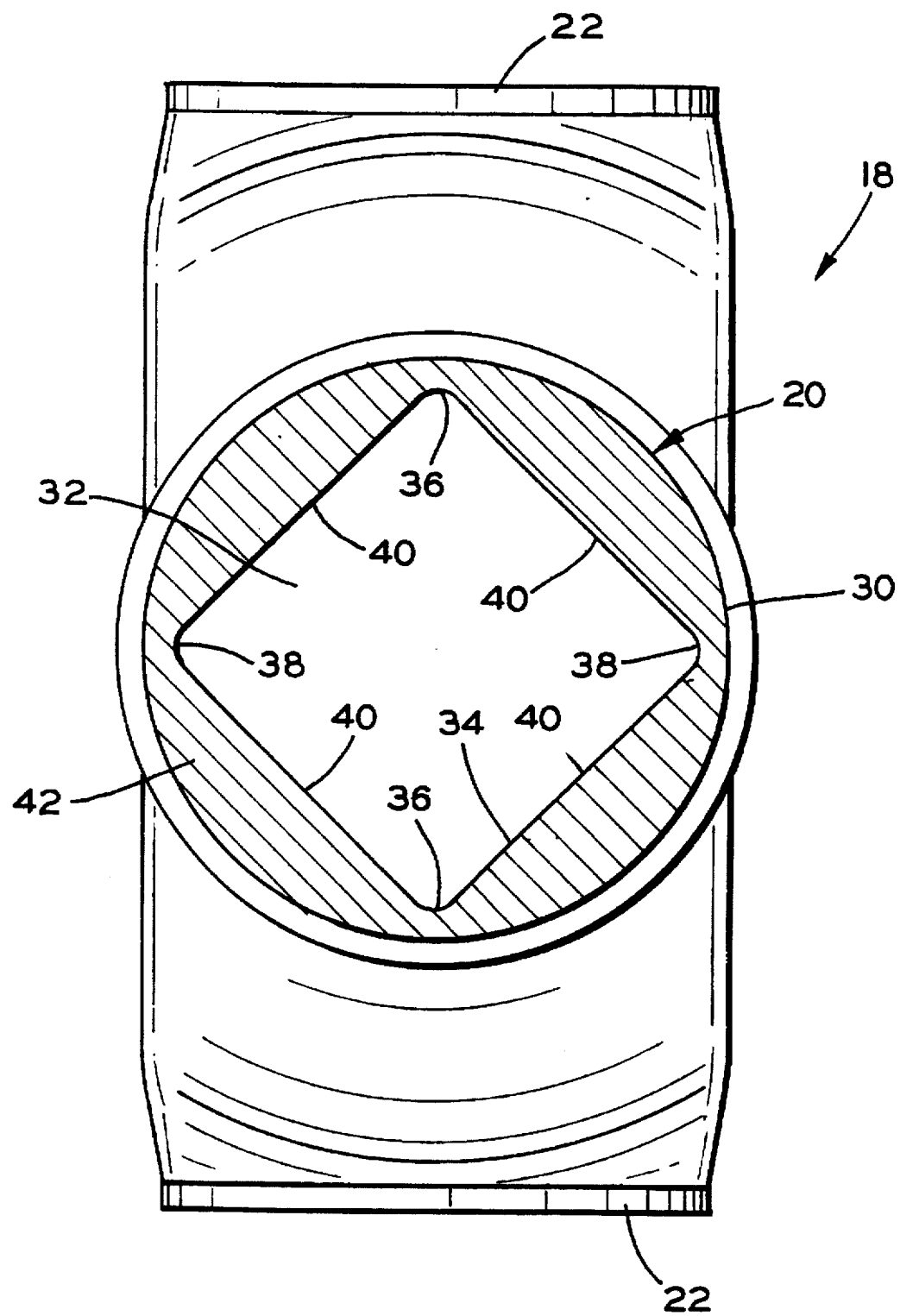
FIG. 3 is an enlarged sectional elevation view taken along line 3—3 of FIG. 2 of a portion of the tube yoke illustrating a diamond-shaped relief formed in an end surface.

To reduce the weight of the tube yoke 18, the tube seat 20 is hollowed out by forming a cavity known as a relief 32. When viewed in cross section as illustrated in FIG. 3 or from an end view, the outline of the relief 32 can be said to resemble a diamond with rounded points. The relief 32 is defined by a non-circular inner surface 34 having two sets of opposed "points" or radial portions approximately equally spaced about the inner surface 34. A first set of opposed points 36 are spaced approximately 180 degrees from each other. A second set of opposed points 38 are spaced approximately 180 degrees from each other and spaced so that each point 38 is approximately 90 degrees from points 36. Preferably, points 36 and 38 are formed along a substantially constant radius. "Flats" 40 are formed between a point 36 and a point 38. Preferably, each of the flats 40 is formed with a smooth, planar surface along the inner surface 34. As illustrated in FIG. 3, the s circular outer surface 30 of the tube seat 20 and the non-circular inner surface 34 define a tube seat wall 42 which is thinnest at the points 36 and 38 and thickest at the flats 40.

During operation of a vehicle, a tube yoke 18 is subjected to heavy torque loads from rotation of the driveline assembly 10. Such heavy loads tend to deflect the lugs 22 of the tube yoke 18. To minimize distortion of the tube seat 20 caused by deflecting lugs 22, the diamond-shaped relief 32 is oriented so that points 36 are aligned with or face the lugs 22. In other words, a line drawn between points 36 is approximately parallel with a line drawn between the centers of the openings 24 formed in the lugs 22. Each point 38 is radially spaced approximately 90 degrees from points 36 so that points 38 face away from the lugs 22. In other words, a line drawn between points 38 is approximately perpendicular to a line drawn between the center of the openings 24 formed in the lugs 22. This orientation provides the thickest parts of the tube seat wall 42 at the locations receiving the greatest stress caused by deflecting lugs 22 during operation of the driveline assembly 10.

The diamond-shaped relief 32 allows the outer surface 30 of the tube seat 20 to retain a uniform circular cross section when the tube yoke 18 is transferring heavy torque loads, thereby prolonging the life of the union between the tube yoke 18 and driveshaft tube 16. The relief 32 also accomplishes the goal of reducing the weight of the tube yoke 18. The dimensions of the diamond-shaped relief 32 can vary to provide different thickness of the tube seat wall 42 suited to particular driveline torque loads. A thicker wall portion is needed to transmit heavier torque loads while the thinner wall portions are suitable for lighter torque loads.

Figure 4:
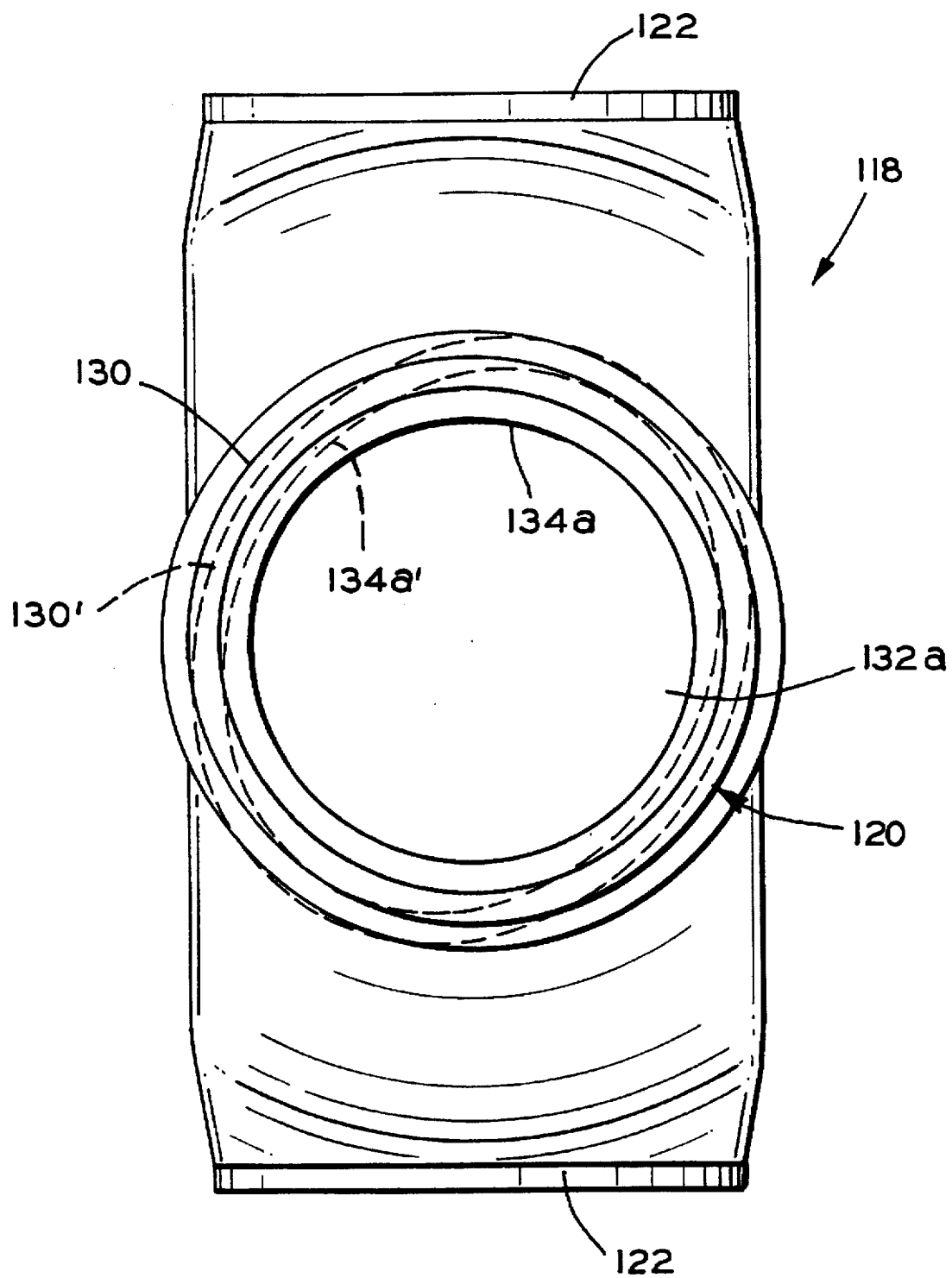
FIG. 4 is a sectional elevation view of a conventional tube yoke illustrating a distorted cross section in phantom.

FIG. 4 illustrates a conventional tube yoke 118 having a tube seat 120 at a first end and a pair of spaced-apart lugs 122 at the opposite end. A cylindrical outer surface 130 is provided about the tube seat 120 which is press fitted into a driveshaft tube 16. A cylindrical relief 132a is formed in an end surface of the tube seat 120 and defined by an cylindrical inner surface 134a. The tube seat outer and inner surfaces 130 and 134a have circular cross sections when the tube yoke 118 is not transferring torque. When subjected to heavy loads, distortion of the tube seat 120 produces outer and inner surfaces 130' and 134a' having a warped cross section, illustrated as an oval-shaped cross section in phantom. When the tube seat 120 is distorted in this way, the union between the tube yoke 118 and driveshaft tube 16 is weakened and can fail prematurely.

Figure 5:
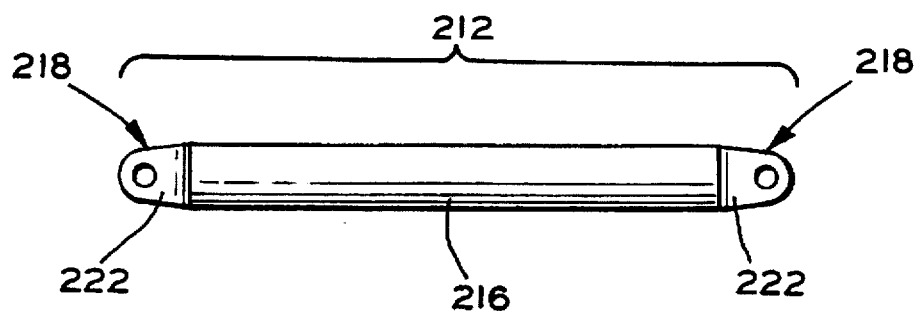
FIG. 5 is a schematic view in elevation of a driveshaft assembly having a tube yoke like that illustrated in FIG. 3 secured to each end of a driveshaft tube.

In certain applications, such as in some passenger vehicles and more often in truck applications, longer vehicular drivelines utilize a driveshaft tube 216 having a tube yoke 218 secured to each end as illustrated in FIG. 5. In such applications, commonly referred to as three-joint drivelines, universal joints (not illustrated) are used to connect each tube yoke 218 to other driveline components. Tube yokes 218 are formed identically to tube yoke 18. Driveshaft tube 216 is a hollow cylindrical tube formed from a suitable material and cut to a desired length. The tube yokes 218 are press fitted into the ends of the driveshaft tube 216 to form a union between the elements so that driveline torque loads can be transferred through the driveshaft assembly 212. Preferably, the tube yokes 218 are aligned to that the lugs 222 of each tube yoke 218 are aligned. As with tube yoke 18, the diamond-shaped reliefs (not illustrated) of the tube yokes 218 cause the tube yokes 218 to resist distortion at their respective tube seats (not illustrated), thereby prolonging the life of the union between the tube yokes 218 and the driveshaft tube 216.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A driveshaft for use in a vehicular driveline assembly comprising:

a tube having an inner surface; and a yoke secured to said tube, said yoke including a body portion, a pair of lugs extending from said body portion having respective aligned openings formed therethrough, and a hollow tube seat extending from said body portion, said tube seat having an outer surface which engages said inner surface of said tube, said tube seat having a first portion aligned with said aligned openings of said lugs which defines a first wall thickness and having a second portion not aligned with said aligned openings of said lugs which defines a second wall thickness, said second wall thickness being greater than said first wall thickness.

2. The driveshaft defined in claim 1 wherein said yoke is press fit within said tube.

3. The driveshaft defined in claim 2 wherein said tube seat of said yoke is press fit within said tube.

4. The driveshaft defined in claim 3 wherein said tube has a cylindrical inner surface and wherein said tube seat of said yoke has a cylindrical outer surface which is press fit within said cylindrical inner surface of said tube.

5. The driveshaft defined in claim 1 wherein said tube seat has an inner surface which is non-circular in shape.

6. The driveshaft defined in claim 1 wherein said tube seat has an inner surface formed having flats which define said first and second portions of said tube seat.

7. The driveshaft defined in claim 6 wherein said inner surface of said tube seat is formed having four of said flats.

8. The driveshaft defined in claim 6 wherein said inner surface of said tube seat is formed having points which join adjacent ones of said flats.

9. The driveshaft defined in claim 8 wherein said points are rounded.

10. The driveshaft defined in claim 8 wherein said points are aligned with said aligned openings of said lugs.

11. A yoke for use in a vehicular driveline assembly comprising:

a body portion;

a pair of lugs extending from said body portion having respective aligned openings formed therethrough; and a hollow tube seat extending from said body portion, said tube seat having an outer surface which engages said inner surface of said tube, said tube seat having a first portion aligned with said aligned openings of said lugs which defines a first wall thickness and having a second portion not aligned with said aligned openings of said lugs which defines a second wall thickness, said second wall thickness being greater than said first wall thickness.

12. The yoke defined in claim 11 wherein said tube seat of said yoke has a cylindrical outer surface.

13. The yoke defined in claim 11 wherein said tube seat has an inner surface which is non-circular in shape.

14. The yoke defined in claim 11 wherein said tube seat has an inner surface formed having flats which define said first and second portions of said tube seat.

15. The yoke defined in claim 14 wherein said inner surface of said tube seat is formed having four of said flats.

16. The yoke defined in claim 14 wherein said inner surface of said tube seat is formed having points which join adjacent ones of said flats.

17. The yoke defined in claim 16 wherein said points are rounded.

18. The yoke defined in claim 16 wherein said points are aligned with said aligned openings of said lugs.

19. A vehicular driveline assembly comprising:

a transmission having an output shaft;

a driveshaft assembly having a slip yoke secured to a first end of a cylindrical driveshaft tube;

a first universal joint connecting said transmission output shaft to said slip yoke;

an axle assembly having an input shaft;

a tube yoke secured to a second end of said cylindrical driveshaft tube, said tube yoke including a body portion, a pair of lugs extending from said body portion having respective aligned openings formed therethrough, and a hollow tube seat extending from said body portion, said tube seat having an outer surface which engages said inner surface of said tube, said tube seat having a first portion aligned with said aligned openings of said lugs which defines a first wall thickness and having a second portion not aligned with said aligned openings of said lugs which defines a second wall thickness, said second wall thickness being greater than said first wall thickness; and a second universal joint connecting said axle assembly input shaft to said tube yoke.

\* \* \* \* \*